US012233977B2

(12) United States Patent
Chang et al.

(10) Patent No.: US 12,233,977 B2
(45) Date of Patent: Feb. 25, 2025

(54) HANDLEBAR ASSEMBLY FOR A BICYCLE AND ACCESSORY STRUCTURE

(71) Applicant: SRAM, LLC, Chicago, IL (US)

(72) Inventors: Ming Chang, Taichung (TW); Nathan Schickel, Indianapolis, IN (US); Benjamin Waite, Indianapolis, IN (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 17/328,596

(22) Filed: May 24, 2021

(65) Prior Publication Data

US 2021/0371032 A1 Dec. 2, 2021

Related U.S. Application Data

(60) Provisional application No. 63/033,173, filed on Jun. 1, 2020.

(51) Int. Cl.
*B62J 11/04* (2020.01)
*A45F 3/18* (2006.01)
*B62J 9/21* (2020.01)
*B62K 21/12* (2006.01)

(52) U.S. Cl.
CPC .................. *B62J 11/04* (2020.02); *A45F 3/18* (2013.01); *B62J 9/21* (2020.02); *B62K 21/12* (2013.01)

(58) Field of Classification Search
CPC ..... B62J 11/04; B62J 9/21; A45F 3/16; A45F 3/18; B62K 21/12; B62K 21/26
See application file for complete search history.

(56) References Cited

U.S. PATENT DOCUMENTS

| 3,920,140 | A | * | 11/1975 | Kiser | B65D 23/003 |
| | | | | | 215/399 |
| D340,217 | S | * | 10/1993 | Delage | D12/411 |
| D714,646 | S | * | 10/2014 | Libman | D9/523 |
| 9,114,840 | B1 | * | 8/2015 | Turner | B62J 11/04 |
| D751,392 | S | | 3/2016 | Wu | |
| 9,452,800 | B1 | * | 9/2016 | Dixon | A45F 3/16 |
| 2008/0053266 | A1 | * | 3/2008 | Smolik | B62J 9/21 |
| | | | | | 74/551.8 |
| 2010/0199801 | A1 | * | 8/2010 | Huang | B62K 21/12 |
| | | | | | 74/551.3 |
| 2011/0219909 | A1 | * | 9/2011 | Galstad | B62K 21/08 |
| | | | | | 74/551.9 |

(Continued)

FOREIGN PATENT DOCUMENTS

| CN | 201660052 | 12/2010 |
| CN | 104058056 | 12/2016 |

(Continued)

OTHER PUBLICATIONS

Protrusion, Merriam-Webster, Oct. 8, 2022 (Year: 2022).*

(Continued)

*Primary Examiner* — Vinh Luong (57) ABSTRACT

A bottle structure for a bicycle handlebar, includes a bottle body having an integrally-formed bottle and bottle coupling structure. The bottle coupling structure is directly connected to the bicycle handlebar, and is dissociable from the bicycle handlebar. The integrated bottle structure may include additional features such as a straw structure or other devices.

7 Claims, 7 Drawing Sheets

(56) References Cited

U.S. PATENT DOCUMENTS

| | | | | |
|---|---|---|---|---|
| 2012/0104063 A1* | 5/2012 | Sweigart | ............... | B62J 11/04 |
| | | | | 224/414 |
| 2013/0032001 A1* | 2/2013 | Smart | ............... | B62K 19/40 |
| | | | | 74/551.8 |
| 2015/0296907 A1* | 10/2015 | Henderson | ............ | B62K 23/02 |
| | | | | 74/502.2 |
| 2016/0046420 A1 | 2/2016 | Wu | | |
| 2017/0001675 A1* | 1/2017 | Kohl | ............... | B62J 11/04 |
| 2020/0046279 A1* | 2/2020 | Rock | ............... | B62J 11/04 |
| 2023/0115519 A1* | 4/2023 | Farrell | ............... | B65D 23/003 |
| | | | | 224/414 |
| 2023/0242200 A1* | 8/2023 | Ohanian | ............... | B62J 9/23 |
| | | | | 224/414 |

FOREIGN PATENT DOCUMENTS

| | | | | |
|---|---|---|---|---|
| CN | 107640392 | | 1/2018 | |
| CN | 216468202 | | 5/2022 | |
| DE | 102013112665 A1 | * | 5/2015 | ............ B62K 21/16 |
| DE | 202020107035 U1 | * | 4/2022 | ............ B62J 9/22 |
| TW | M317379 | | 3/1996 | |
| WO | WO 9219487 | * | 11/1992 | ............ B62J 11/00 |
| WO | WO 9300250 | * | 1/1993 | ............ B62K 21/12 |
| WO | WO 2015071480 A1 | * | 5/2015 | ............ B62K 21/12 |

OTHER PUBLICATIONS

Machine translation of WO 2015071480 A1, Hoffleitt, May 21, 2015 (Year: 2015).*

Machine translation of WO 9300250, Martin et al., Jan. 7, 1993 (Year: 1993).*

Machine translation of DE 202020107035 U1, Delic et al., Apr. 14, 2022 (Year: 2022).*

Machine translation of CN 201660052 U, Chen, Dec. 1, 2010 (Year: 2010).*

Translation of DE 202020107035 U1, Canyon Bicycles GmbH, Apr. 14, 2022 (Year: 2022).*

Aeromount Aero Hydration System Mounting Bracket, Web page: https://www.torhans.com/collections/store-front/products/aeromount , last checked Jun. 1, 2023.

Aeroz, Web page: https://www.torhans.com/collections/aeroz/products/aeroz , last checked Jun. 1, 2023.

Drinking System DS1, Web page: https://shop.visiontechusa.com/type/hydration/hydration/road-triathlon-time-trial-track/drinking-system-ds1 , last checked Jun. 1, 2023.

Hydroblade Tri Edition, Web page: https://www.xlab-usa.com/hydroblade.html, last checked Jun. 1, 2023.

Sprint Kit, Web Page: https://speedfil.com/hydration-systems/sprint-kit#1456026403398-87c3bace-faa6 , last checked Jun. 1, 2023.

Torpedo Versa 200—Aluminium, Web page: https://www.xlab-usa.com/torpedo-versa-200.html , last checked Jun. 1, 2023.

Vision Metron Front Hydration System, Web page: https://silverbackbikes.de/products/metron-front-hydration-system , last checked Jun. 1, 2023.

Vuka Aero, Web page: https://www.sram.com/en/zipp/models/hb-vk-aero-c2, last checked Jun. 1, 2023.

Vuka Aero, Web page: https://www.sram.com/en/service/models/ac-cm-bta-a1 , last checked Jun. 1, 2023.

Aeria Hydration System, Web page: https://profile-design.com/products/aeria-hydration-system , last checked Jul. 10, 2023.

* cited by examiner

HANDLEBAR ASSEMBLY FOR A BICYCLE AND ACCESSORY STRUCTURE

This application claims priority to, and/or the benefit of, U.S. provisional patent application 63/033,173, filed on Jun. 1, 2021, the contents of which are incorporated herein in their entirety.

FIELD

The disclosure relates to a handlebar assembly for a bicycle, and more particularly to a handlebar assembly with an accessory structure.

BACKGROUND

When riding a bicycle during an outdoor exercise routine, attachment mechanism of an accessory structure onto the bicycle, such as a water bottle, is commonly sought after for portability. As disclosed in U.S. Patent Application Publication No. 2016/0046420, a conventional water bottle for a bicycle is supported by and attached onto an upper side of a handlebar of the bicycle by a bracket or straps. However, in such configuration, the dimension of the water bottle permitted to be stably supported by the handlebar may be limited, and position of the water bottle relative to the handlebar may be adverse to the bicycle in terms of aerodynamics.

Another conventional water bottle is disposed below the handlebar, and is attached to a bracket that is fixed to a stem of the bicycle. However, an assembly of the conventional water bottle and the bracket is only suitable for a specific stem. For bicycles having stems of different dimensions, brackets of different dimensions are correspondingly needed for attachment of the water bottle onto the bicycles.

SUMMARY

Therefore, an object of the disclosure is to provide an accessory structure that can alleviate at least one of the drawbacks of the prior art.

According to the disclosure, the accessory structure, in this case a bottle structure, is adapted for a bicycle handlebar, and includes a bottle body having an integrally-formed bottle coupling structure. The bottle coupling structure is directly connected to the bicycle handlebar, and is dissociable from the bicycle handlebar.

Another object of the disclosure is to provide a handlebar assembly that can alleviate at least one of the drawbacks of the prior art.

According to the disclosure, the handlebar assembly is adapted for a bicycle, and includes a handlebar and an accessory, or bottle, structure. The handlebar has a handlebar coupling structure. The bottle structure includes a bottle body that has an integrally-formed bottle coupling structure. The bottle coupling structure is directly connected to the handlebar coupling structure of the handlebar, and is dissociable.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

A handlebar assembly may include a coupling structure for one or more accessories. The accessories may include a practical implement, such as an enclosed space for porting water during a bicycle ride. The practical implement includes reciprocal features for attaching to the coupling structure. The practical implement may also be detachable from the coupling structure.

Figure 1:
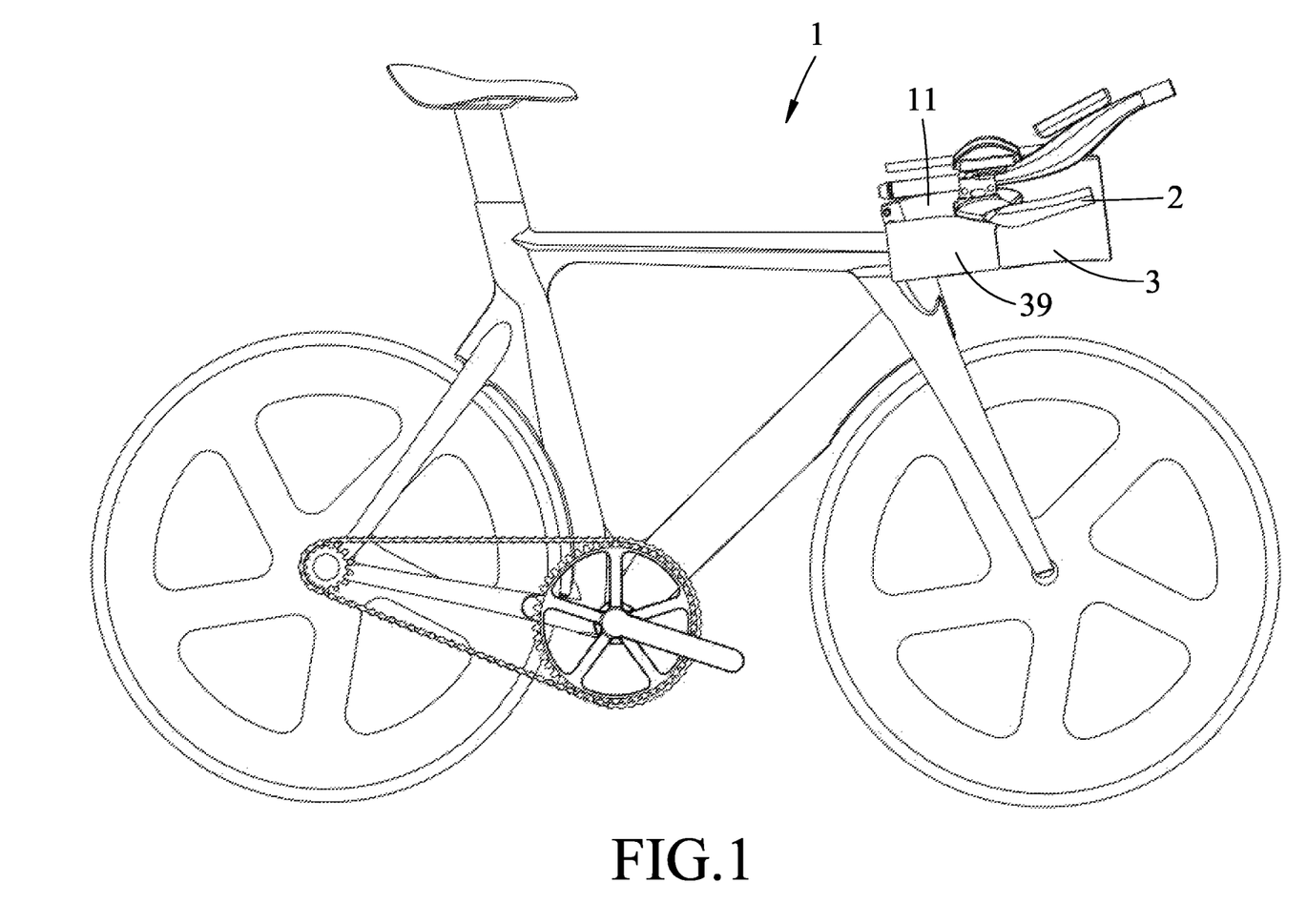
FIG. 1 is a side view illustrating a bicycle mounted with the handlebar assembly according to the disclosure.
Figure 2:
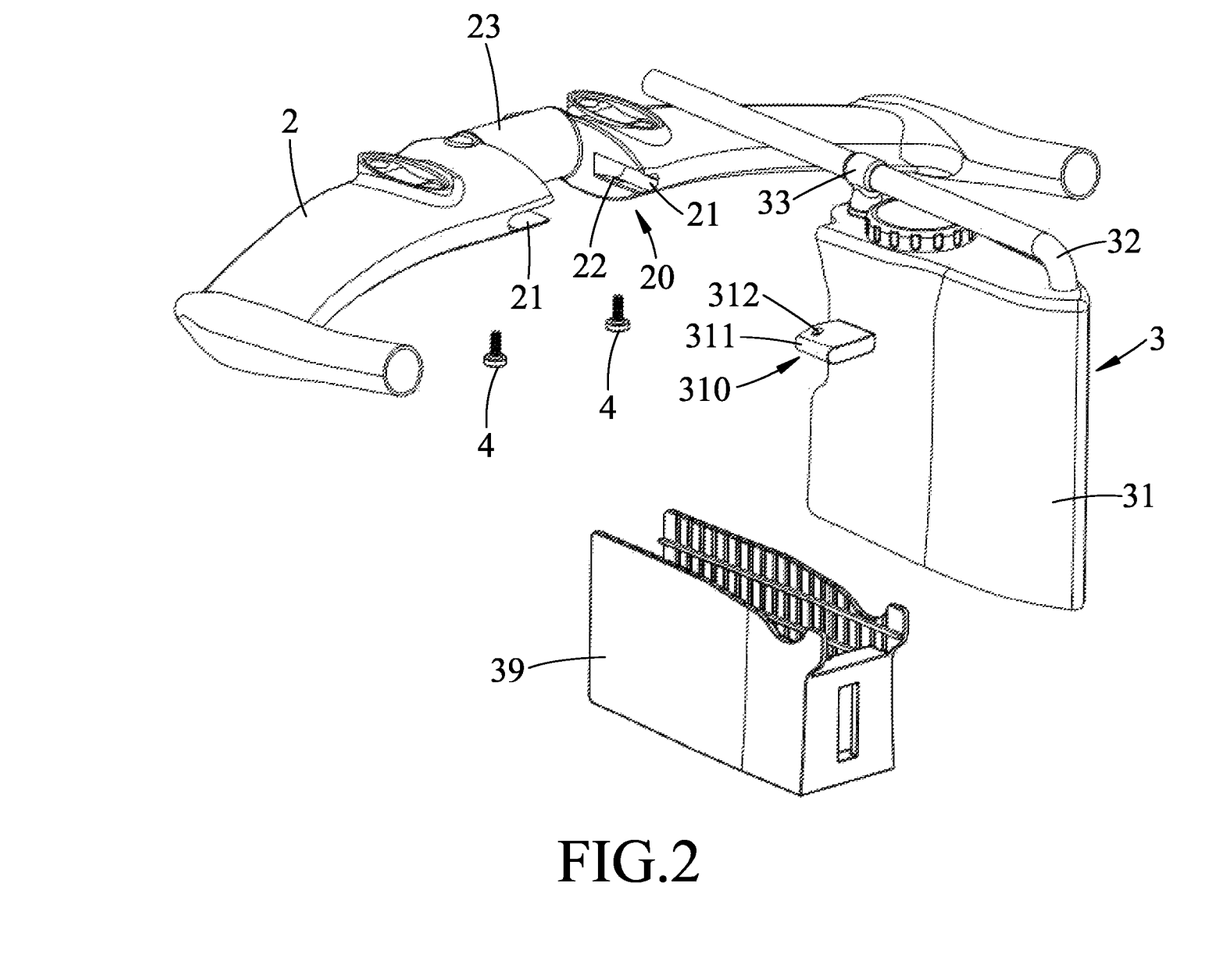
FIG. 2 is a partly exploded perspective view illustrating the handlebar assembly.
Figure 3:
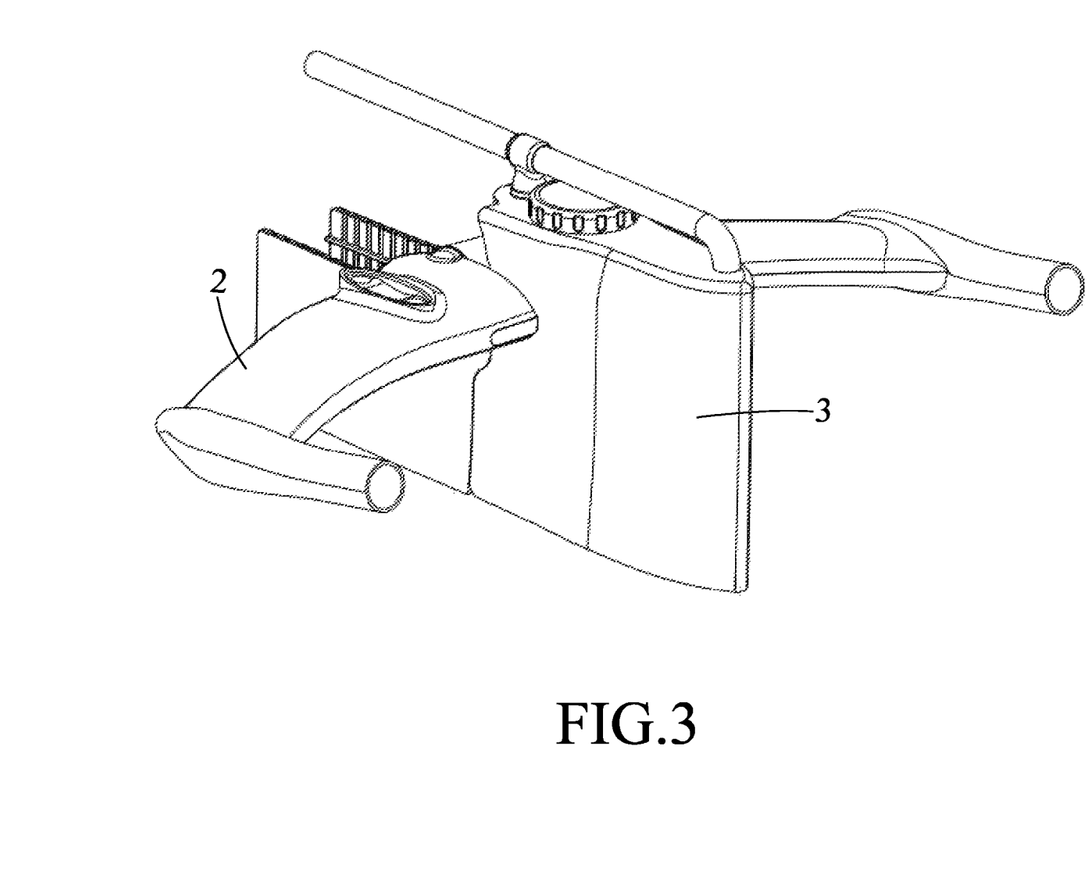
FIG. 3 is a perspective view illustrating a handlebar and a bottle structure of the handlebar assembly being assembled.
Figure 4:
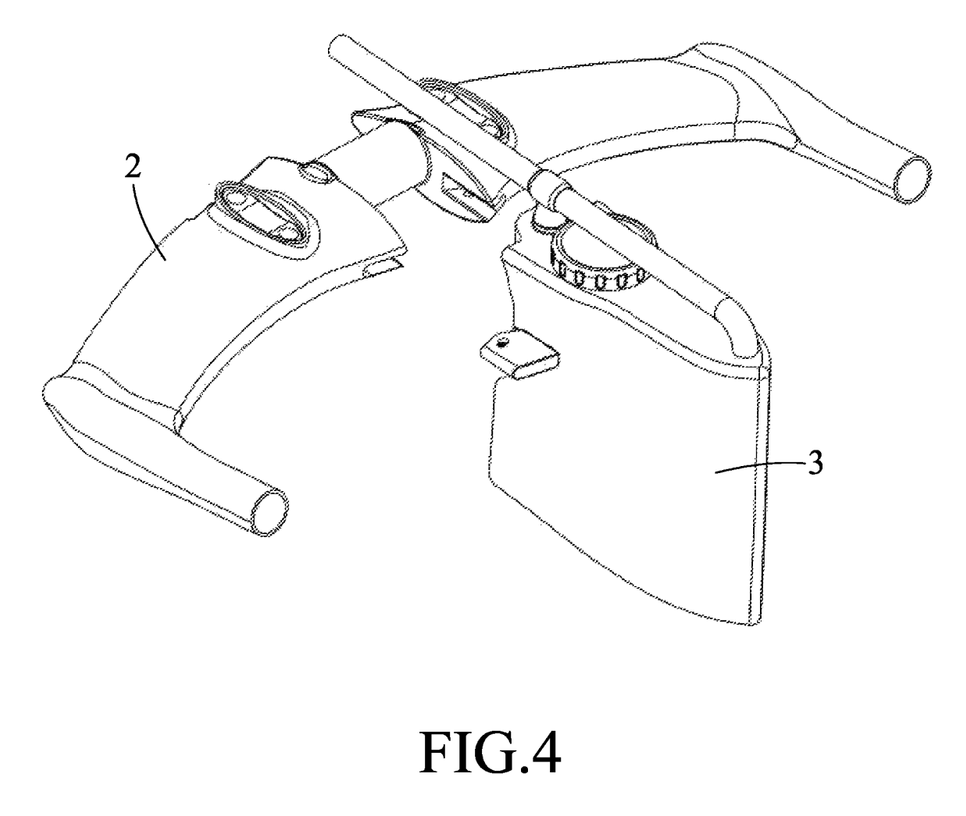
FIG. 4 is a perspective view illustrating the handlebar and the bottle structure being separated.

Referring to FIGS. 1 and 2, the handlebar assembly according the disclosure is mounted to a stem 11 of a bicycle 1, and includes a handlebar 2 and an accessory bottle structure 3. The handlebar 2 has a handlebar coupling structure 20 and a stem-clamping portion 23. The accessory bottle structure 3 includes a bottle body 31 that serves as a container for drinks and that has a protruding accessory coupling structure, in this case a bottle coupling structure 310. The bottle coupling structure 310 is able to be directly connected to the handlebar coupling structure 20 of the handlebar such that the bottle structure 3 is attached to the handlebar 2 (see FIG. 3), and is able to be dissociated from the handlebar coupling structure 20 such that the bottle structure 3 is separated from the handlebar 2 (see FIG. 4). The stem-clamping portion 23 is mounted to the stem 11 of the bicycle 1.

Figure 5:
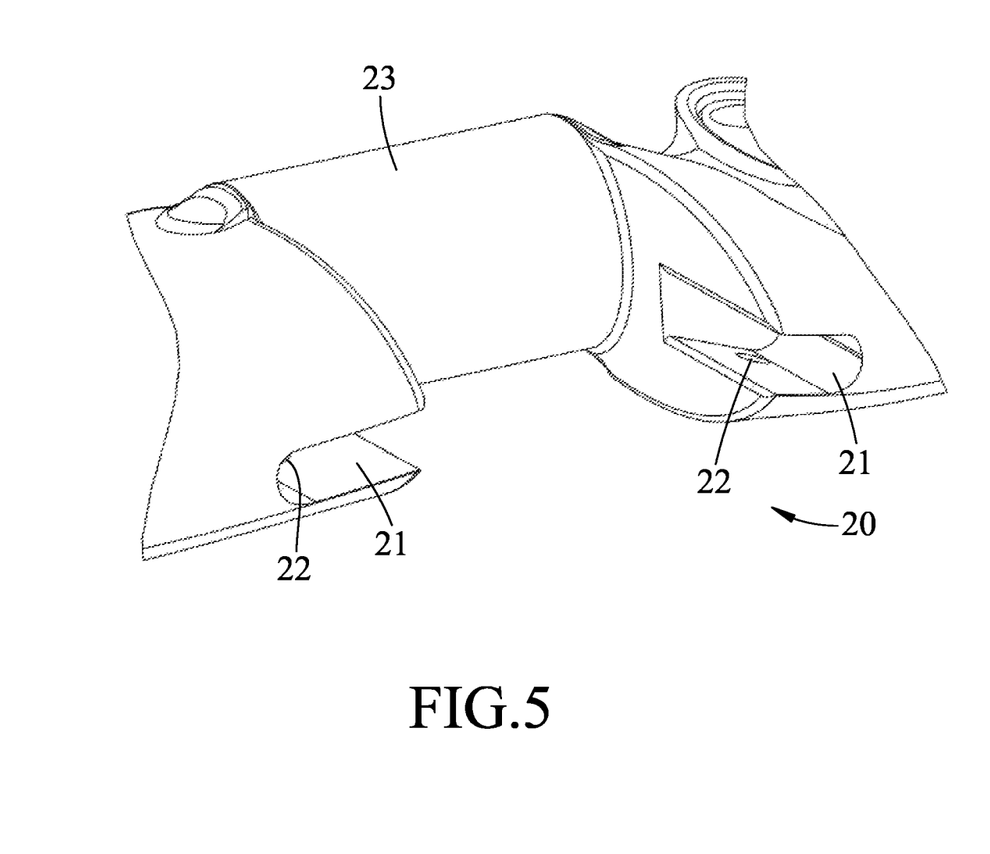
FIG. 5 is a fragmentary perspective view illustrating a handlebar coupling structure of the handlebar.
Figure 6:
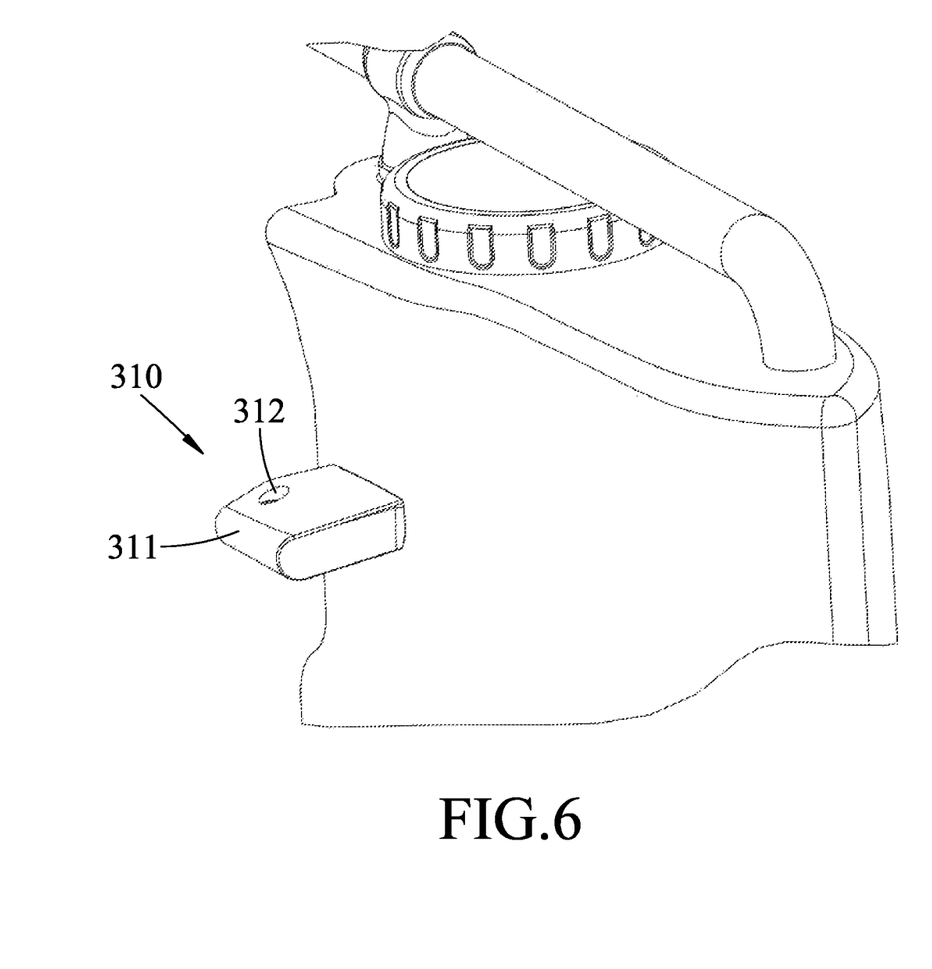
FIG. 6 is a fragmentary perspective view illustrating a bottle coupling structure of the bottle structure.

Referring further to FIGS. 5 and 6, the handlebar coupling structure 20 includes two engaging grooves 21 that are spaced apart from each other in a lateral direction of the bicycle 1. The bottle coupling structure 310 includes two protrusions 311 (only one is visible) that are respectively located at two opposite lateral sides of the bottle body 31, that respectively and directly engage the engaging grooves 21 of the handlebar 2, and that are dissociable from the engaging grooves 21. In one embodiment, each of the engaging grooves 21 substantially extends in a front-rear direction of the bicycle 1.

In one embodiment, the handlebar coupling structure 20 further includes two handlebar connecting holes 22 that are respectively in spatial communication with the engaging grooves 21 (see FIG. 5) and that extend in a direction different from that of the engaging grooves 21. Each of the protrusions 311 of the bottle body 31 is formed with an accessory connecting hole, in this case a bottle connecting hole 312 (only one is visible), that is registered with a respective one of the handlebar connecting holes 22 and that permits a fastener 4 (see FIG. 2) inserted into the respective one of the handlebar connecting holes 22 to extend therein, so that the bottle structure 3 is firmly attached to the handlebar 2. In one embodiment, at least one of the bottle connecting holes 312 is configured as a tapped hole. In one embodiment, at least one of the bottle connecting holes 312 is configured as a through hole. The fastener 4 may be configured as a bolt, a screw or the like.

Figure 7:
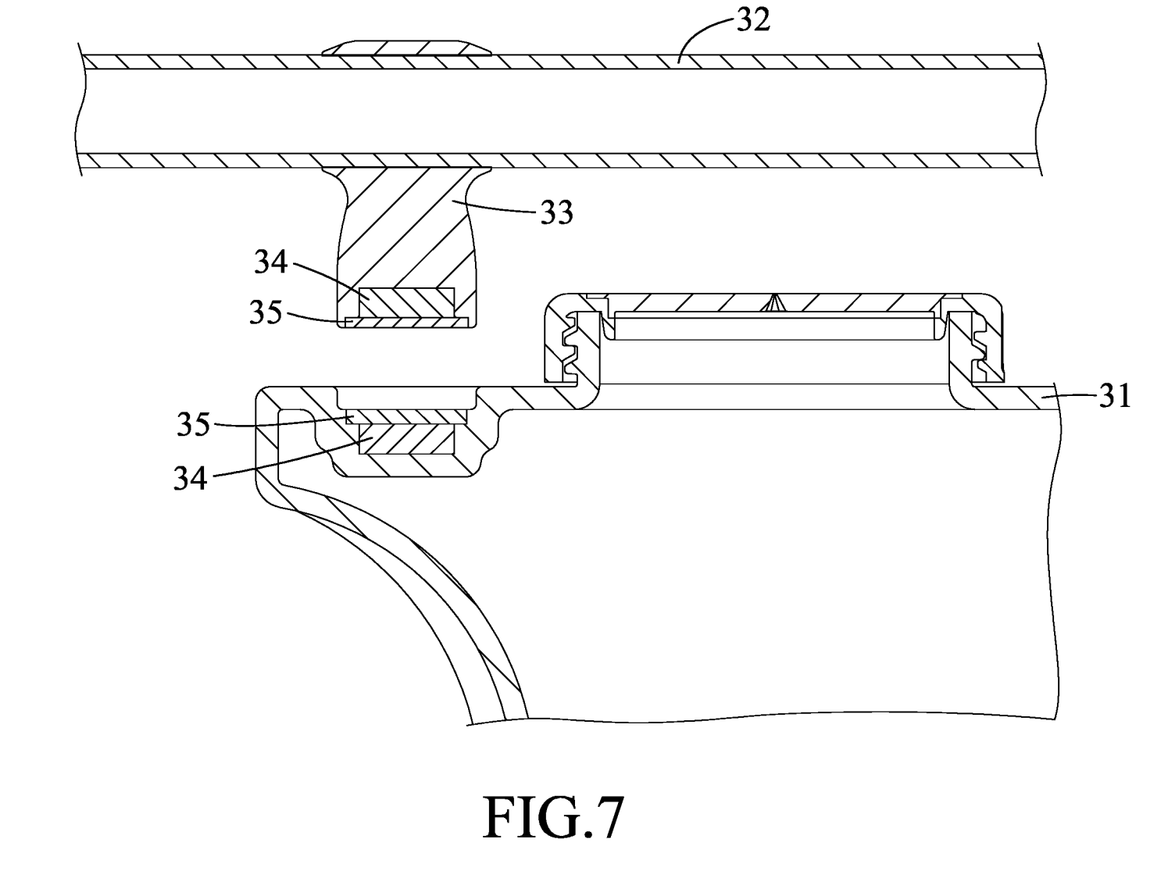
FIG. 7 is a fragmentary sectional view of the bottle structure.

Referring back to FIG. 2, in one embodiment, the bottle structure 3 further includes a straw 32 that is connected to the bottle body 31, and a straw holder 33 that is attached to the straw 32. In one embodiment, the bottle structure 3 further includes two magnets 34 (see FIG. 7) that are respectively mounted to the bottle body 31 and the straw holder 33, and that are magnetically coupled to each other for positioning the straw 32 relative to the bottle body 31. In one embodiment, the bottle structure 3 further includes two covers 35 (see FIG. 7) that are respectively mounted to the bottle body 31 and the straw holder 33 and that respectively cover the magnets 34.

Referring back to FIG. 2, in one embodiment, the bottle body 31 has a major portion located below the handlebar 2, and the bottle structure 3 further includes a shield member 39 that is connected to the bottle body 31 for streamlining the bottle structure 3. In one embodiment, the shield member 39 is connected to a rear side of the bottle body 31, and extends around the stem 11 of the bicycle 1 (see FIG. 1) for streamlining an assembly of the handle assembly and the stem 11.

In summary, since the bottle structure 3 is directly connected to the handlebar 2 by virtue of the integrally-formed bottle coupling structure 310 thereof, the handlebar assembly according to the disclosure is suitable for stems of different dimensions. In addition, since the bottle body 31 has a major portion located below the handlebar 2, the volume of the bottle body 31 may not be limited by some add-ons (with reference to FIG. 1), such as armrests or auxiliary grips, that are mounted on the handlebar 2.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A bottle structure adapted for a bicycle handlebar, comprising:
    a bottle body having an integrally-formed bottle coupling structure, the bottle coupling structure being adapted to be removably connected to the bicycle handlebar, and a straw that is connected to the bottle body, a straw holder that is attached to the straw, and two magnets that are respectively mounted to the bottle body and the straw holder, and that are magnetically coupled for positioning the straw relative to the bottle body.

2. A handlebar assembly adapted for a bicycle, comprising:
    a handlebar having a handlebar coupling structure; and
    a bottle structure including a bottle body that has an integrally-formed bottle coupling structure, the bottle coupling structure being removably connected to the handlebar coupling structure of the handlebar and dissociable,
    wherein the handlebar coupling structure includes at least one engaging groove, and the bottle coupling structure includes at least one protrusion that removably engages the at least one engaging groove of the handlebar, and the handlebar coupling structure includes a handlebar connecting hole that is in spatial communication with the at least one engaging groove and that extends in a direction different from that of the at least one engaging groove, the at least one protrusion of the bottle body being formed with a bottle connecting hole that is registered with the handlebar connecting hole and that is adapted to permit a fastener inserted into the handlebar connecting hole to extend therein.

3. The handlebar assembly as claimed in claim 2, wherein the bottle connecting hole is configured as a tapped hole.

4. The handlebar assembly as claimed in claim 2, wherein the bottle connecting hole is configured as a through hole.

5. The handlebar assembly as claimed in claim 2, wherein the handlebar coupling structure includes two of the engaging grooves, the bottle coupling structure includes two of the protrusions that are respectively located at two opposite lateral sides of the bottle body and that respectively and directly engage the engaging grooves of the handlebar.

6. The handlebar assembly as claimed in claim 2, wherein the bottle structure further includes a shield member that is connected to the bottle body for streamlining the bottle structure.

7. A handlebar assembly adapted for a bicycle, comprising:
    a handlebar having a handlebar coupling structure; and
    a bottle structure including a bottle body that has an integrally-formed bottle coupling structure, the bottle coupling structure being removably connected to the handlebar coupling structure of the handlebar,
    wherein the bottle structure further includes a straw that is connected to the bottle body, a straw holder that is attached to the straw, and two magnets that are respectively mounted to the bottle body and the straw holder, and that are magnetically coupled for positioning the straw relative to the bottle body.

* * * * *